(12) United States Patent
Bernot et al.

(10) Patent No.: US 9,337,710 B2
(45) Date of Patent: May 10, 2016

(54) HOMOPOLAR MOTOR PHASE

(75) Inventors: François Bernot, Luynes (FR); Alix Bernot, Saint Cyr sur Loire (FR)

(73) Assignee: SINTERTECH, Veurey-Voroize (FR)

( * ) Notice: Subject to any disclaimer, the term of this patent is extended or adjusted under 35 U.S.C. 154(b) by 520 days.

(21) Appl. No.: 13/643,768

(22) PCT Filed: Apr. 28, 2011

(86) PCT No.: PCT/FR2011/050974
§ 371 (c)(1),
(2), (4) Date: Nov. 20, 2012

(87) PCT Pub. No.: WO2011/135268
PCT Pub. Date: Nov. 3, 2011

(65) Prior Publication Data
US 2013/0099619 A1    Apr. 25, 2013

(30) Foreign Application Priority Data

Apr. 28, 2010   (FR) ...................................... 10 01807

(51) Int. Cl.
*H02K 1/12* (2006.01)
*H02K 37/14* (2006.01)
*H02K 31/00* (2006.01)
*H02K 1/14* (2006.01)

(52) U.S. Cl.
CPC ................ *H02K 31/00* (2013.01); *H02K 1/145* (2013.01); *H02K 37/14* (2013.01)

(58) Field of Classification Search
None
See application file for complete search history.

(56) References Cited

U.S. PATENT DOCUMENTS 2,901,645  A       8/1959  Sulger
7,605,517  B2 *   10/2009  Enomoto et al. .............. 310/257

FOREIGN PATENT DOCUMENTS

| EP | 1 087 502 A2 | 3/2001 |
|----|--------------|--------|
| EP | 1 263 115 A2 | 12/2002 |
| EP | 1 770 846 A2 | 4/2007 |
| EP | 1 806 825 A2 | 7/2007 |
| FR | 2 570 228 A1 | 3/1986 |
| JP | 60 204249 A  | 10/1985 |
| JP | 3 265457 A   | 11/1991 |

OTHER PUBLICATIONS

International Search Report, dated Aug. 19, 2011, from corresponding PCT application.

* cited by examiner

*Primary Examiner* — Tran Nguyen
(74) *Attorney, Agent, or Firm* — Young & Thompson

(57) ABSTRACT

A homopolar motor phase (d4) which consists of a wafer (a0), the leg (a3) of each tooth meeting the leg of the next tooth before touching the cylinder head (a4), the leg (a3) at least partially filling the space (a6) between the teeth. The inner diameter (a11) is reduced by the presence of a discontinuity in the area (a7) at the tip of the tooth (a5).

20 Claims, 7 Drawing Sheets

HOMOPOLAR MOTOR PHASE

BACKGROUND OF THE INVENTION

1. Field of the Invention

The present invention relates to a rotating electrical machine with a homopolar structure including a stator and a rotor rotating around a same axis of rotation as the stator, housed in a frame, at least the stator or the rotor consisting of at least one electrical coil of an annular shape borne by a magnetic annular frame yoke including at least two angularly shifted poles at an equal distance from each other, these poles being formed by tabs firmly attached to said annular frame yoke and folded parallel to said axis.

2. Description of the Related Art

The structure and the operation of an electric machine of this type, such as an electric rotating machine, are described in patents FR 00/06298 and BR 18083/FR (inventor Francois Bernot).

FIG. 1 shows the state of the prior art for this homopolar structure, in an octopolar version, with a three-phase stator with claws and a rotor with surface magnets. Another version may include a rotor with embedded magnets.

Another version may include a polyphase stator, the number of phases being arbitrary (greater than or equal to one), another version may include an inverted external rotor.

The embodiment of FIG. 1 includes three identical stators, which will be noted in this document as phases when they are complete with their coil (c4, c5 or c6). Said stators are numbered as (c1), (c2) and (c3). These wafers are phase-shifted relatively to each other by a mechanical angle of about 30°. In the case of the embodiment shown in FIG. 1, the angle (c10) substantially has a value of 30° and the angle (c11) substantially has a value of 60°. The angle (c10) substantially corresponds to the third of the electric angle of the rotating machine, said electrical angle being equal to 360° (one turn) divided by the number of pairs of poles (four in this octopolar case). The angle (c11) substantially has a value of twice the angle (c10). These angular shifts may be different, depending on the applications, but these variations fall under the known state of the prior art, notably applied to other structures of rotating machines They are only used for optimizing the final machine A two-phase version of said machine will only include two stators (c1) and (c2) which would then be shifted by an angle (c10)=45° in the octopolar embodiment described in FIG. 1. The rules for calculating the angular shifts between phases or respective stators are part of the state of the prior art.

In the embodiment of FIG. 1, the stators (c1), (c2) and (c3) have a structure with claws, which is characterized by apparent undulation of stator coils, noted as (c4), (c5) and (c6), respectively around planes of rotation X/Y (c12) of each stator. Said undulation may be obtained by twisting the stator teeth, as proposed by patent BR 18075/FR, or further by encircling the coils, (c4), (c5) and (c6) as proposed by patent BR 18083/FR.

In the latter clever embodiment, shown in FIG. 2, for a number of poles equal to 28, the stators (c1), (c2) and (c3) are all made in the same way, from two identical wafers (b1) and (b2), clamping a coil (b3). Said wafers are assembled onto each other, according to patent BR 18083/FR, so that their respective teeth (b4) and (b5), are substantially equidistant. The wafer (b1) is laid on the wafer (b2), as indicated by the arrow (b7). The contact areas (b30) between the wafers (b1) and (b2) have to be made properly, in order to avoid undesirable magnetic gaps in the contact area.

The shape of this contact area (b30) may not consist of a coplanar plane along X/Y (c12), but may adopt any other shape such as an undulation or further a crenellation, which would allow relative angular setting of said wafers (b1) and (b2). The wafer (b2) is angularly shifted relatively to the wafer (b1). Said setting angle (b6) in the case of the stator of FIG. 2 has substantially the value of half the electric angle of the machine, i.e. for this polarity of 14 pairs of poles shown in FIG. 2, the value: 12,857°.

It is important to note that the embodiments of FIGS. 1 and 2 consider that each tooth (b4) and (b5) forms a complete electric pole of the machine Therefore, in FIG. 1, we are in the presence of an assembly of single-phase electric rotating machines, axially gathered around a same rotor (c7). Said rotor may be of several natures, synchronous, asynchronous or with variable reluctance. The different embodiments known to this day of the rotors are part of the state of the prior art, they are all adapted to the presence of an assembly of stators with claws, as described in FIG. 1.

We shall designate subsequently in this document, the stators (c1), (c2) and (c3) as <<phases>>, in order to clarify their role; the rotor is common to the three phases. In the whole following description, we shall therefore consider the assembly formed by two wafers (b1) and (b2), clamping a coil (b3) as a complete phase. FIG. 3 again assumes in a more synthetic way this proposal, by showing both of these wafers (d1) for (b1), and (d2) for (b2), which are gathered against each other along the direction (d3), in order to form a single phase (d4), as described above corresponding to the joining of two wafers (b1) and (b2), clamping a coil (b3). A note should be made at this stage of the description of the state of the art, of the benefit of providing a means for axially maintaining the wafers (b1) and (b2) on each other, which may for example consist in an elastic clamping washer, mounted in any location of the axis of rotation of the plane XY (c12).

All these descriptions of FIGS. 1 and 2 are part of the state of the prior art. They include the version with an inverted stator, wherein the teeth (b4) and (b5) of the wafers (b1) and (b2) are located on the outer periphery, with a rotor which is located exteriorly to the stator.

The state of the prior art clearly shows the interchangeability of the different elements of an electric rotating machine, notably their internal or external relative positions, as shown in FIG. 4. The phase (d4), consisting of two wafers (d1) and (d2), may be located on the outside of a part (e2), in order to then form a single-phase homopolar rotating machine (e4). The phase (d4), consisting of two wafers (d1) and (d2) may be located inside a part (e3), in order to then form a single-phase homopolar rotating machine (e5). Axial juxtaposition of these complete machines (e4) or (e5), angularly shifted by an adequate angle, as known from the state of the art explained above, forms a polyphase rotating machine.

In this presentation of FIG. 4, the parts (d4), (e2) and (e3) may be static or rotary. If a part (d4) is rotary, it has to be powered either by rings or by any other system (rotating diodes for example).

The stator combination (d4) and with rotating magnets (or wound inductor) (e2) corresponds to a machine (e4) forming a so-called synchronous machine.

The phase (d4) is then powered with alternating current and according to so-called brushless control methods known to one skilled in the art.

The stator (d4) combination and with rotating magnets (or wound inductor) (e3) corresponds to a machine (e5) forming a so-called inverted synchronous machine. The phase (d4) is then powered with alternating current and according to the known so-called brushless control methods.

The stator (e3) and rotor (d4) combination, corresponds to a machine (e5) forming an alternator with claws, a so-called Lundell alternator, widely used in heat engines.

All the other combinations are possible, such as a rotor (d4) and stator (e2) configuration or further a rotor (d4) and stator (e3) combination, or else both rotating portions (d4) and (e2), or further both rotating portions (d4) and (e3).

These different combinations are widely described in the state of the art, for rotating machines with a coplanar structure.

Publication No. EP 1 263 115 A2 of the European Patent application No. 02253728, as well as publication No. EP 1 770 846 A2 of the European Patent application No. 06020595 both describe annular phase wafers, provided with teeth, the tooth leg of which has constant radial thickness (i.e. along the radius of the wafer).

BRIEF SUMMARY OF THE INVENTION

The following description of the invention relates to the embodiment of the phase (d4) which may be inserted in diverse configurations, which we have just mentioned. Said phase (d4) may be integrated into a rotating machine customized by the portions (e2) or (e3). The final configuration of the machine which integrates said phase (e4) relates to all the final use alternatives of the invention, which follow, plus those which are not mentioned which fall under the state of the prior art.

The following list groups in a non-exhaustive way various possible alternatives of applications of the invention in a rotating electrical machine.
- a synchronous machine with a wound rotor or with magnets,
- an asynchronous machine with a wound rotor or with a cage,
- a machine with variable reluctance, with a passive or active (magnetized) rotor.

The following list groups in a non-exhaustive way various possible alternative embodiments of the invention in order to form an electric rotating machine.
- the relative arrangement of the different portions (d4), (e2) and (e3), in order to form a machine of the (e4) or (e5) type, leads to a machine with an outer stator or with an inner stator, a so-called inverted machine,
- a single-phase, two-phase, three-phase or polyphase machine, obtained by axially stacking elementary machines (e4) or (e5) properly phase-shifted relatively to each other by an electric angle substantially equal to one electric turn (360° divided by the number of pairs of poles) divided by the number of phases, said angular phase shift may be created at the rotor or at the stator.
- a polyphase machine including at least one phase, wherein each electric phase consists of several elementary (e4) machines or machines (e5) electrically connected in series or electrically in parallel.
- a polyphase machine, including at least one phase, wherein the phases (d4) are all aligned angularly and wherein the inter-phase phase-shift is caused by rotation, depending on the case, of either magnets or wound inductors, or conductors of the complementary parts (e2) or (e3).
- a polyphase machine, including at least one phase, wherein the coils (b3) are divided into several distinct windings, themselves coupled from one phase to the other in a zig-zag, star or triangle pattern in order to form a complete polyphase machine the assembly may also form a static transformer wherein all the portions (d4), (e2) and (e3) being static, form a static phase shifter.

BRIEF DESCRIPTION OF DRAWINGS

Other objects and advantages of the present embodiments will become apparent from a study of the following specification when viewed in the light of the accompanying drawings, in which.

DETAILED DESCRIPTION OF PREFERRED EMBODIMENTS

Figure 1:
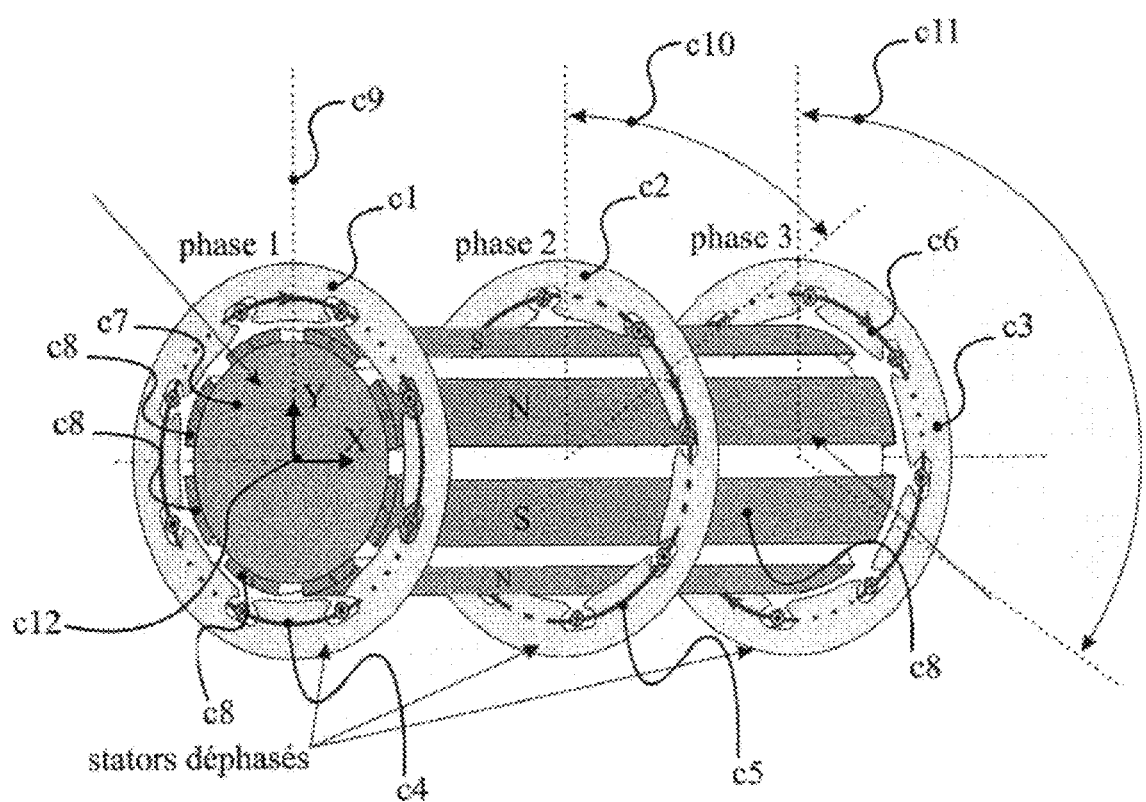
FIG. 1 illustrates the state of the prior art for a homopolar structure.
Figure 2:
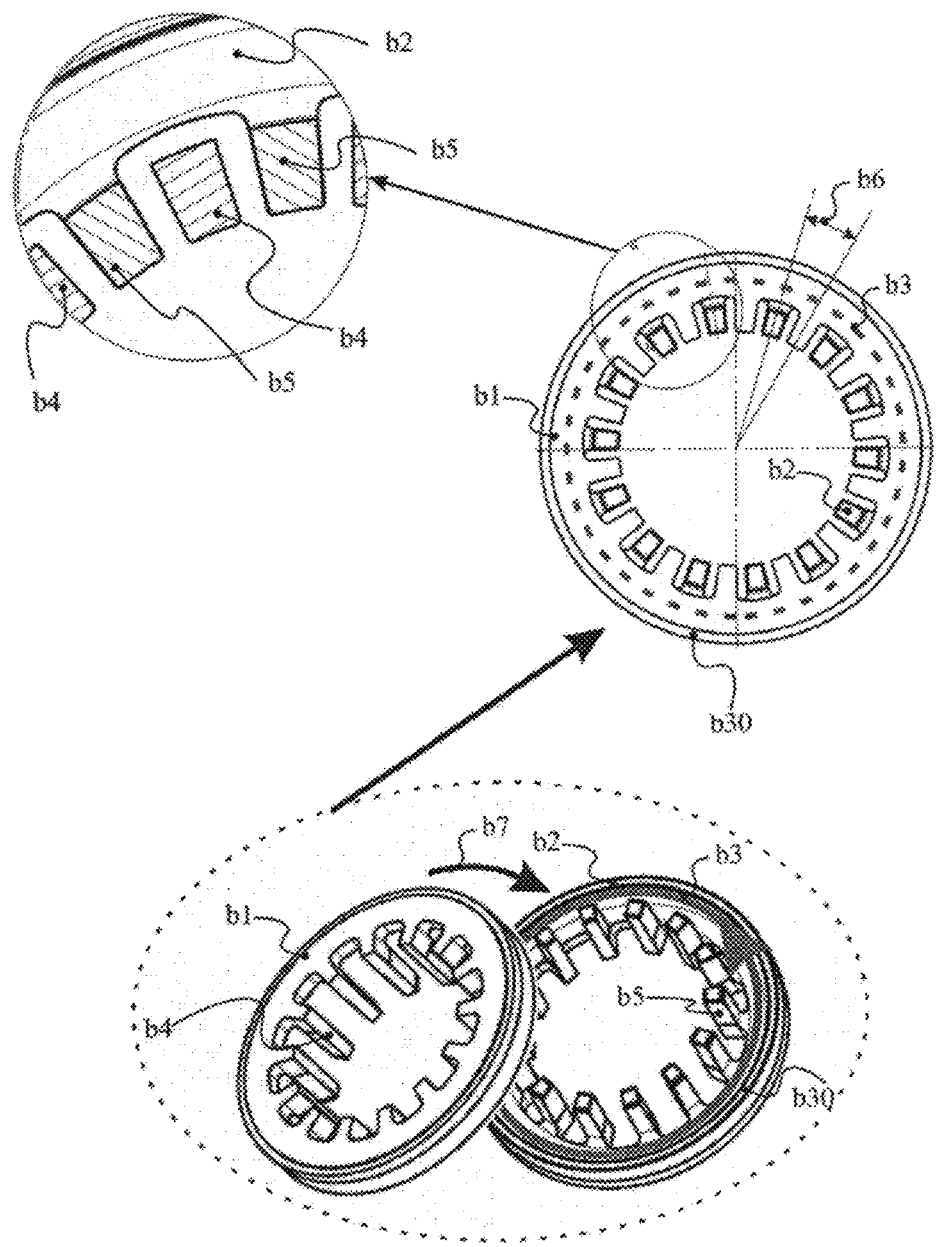
FIG. 2 illustrates the state of the prior art for another homopolar structure.
Figure 3:
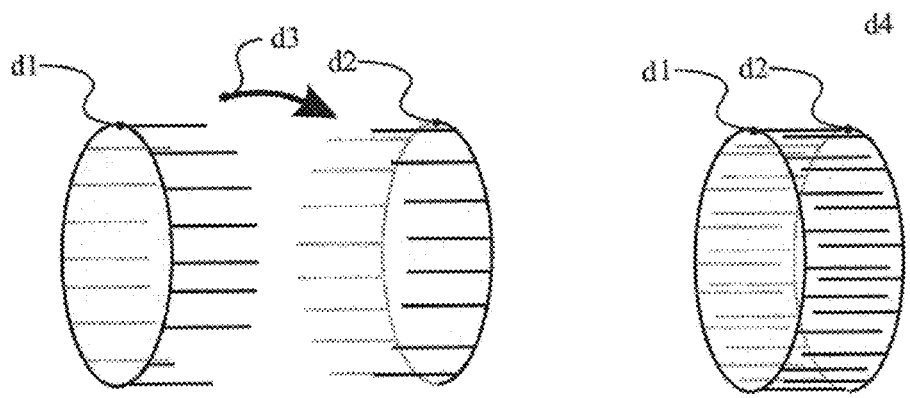
FIG. 3 illustrates the state of the prior art for a homopolar structure.
Figure 4:
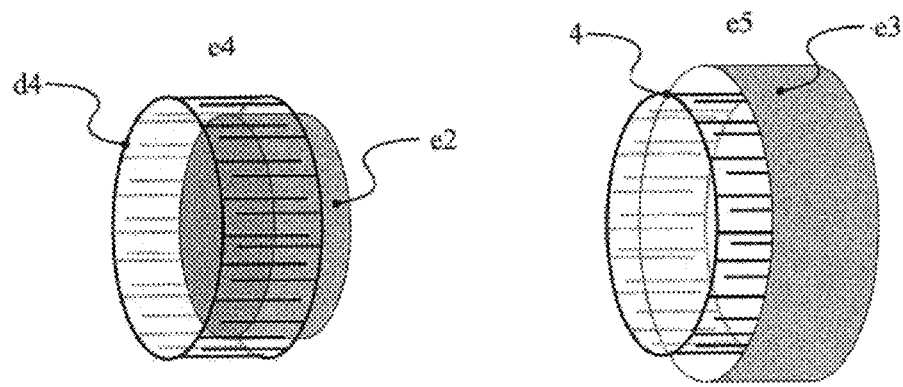
FIG. 4 illustrates relative positions of different elements of an electric rotating machine, according to the related art.
Figure 5:
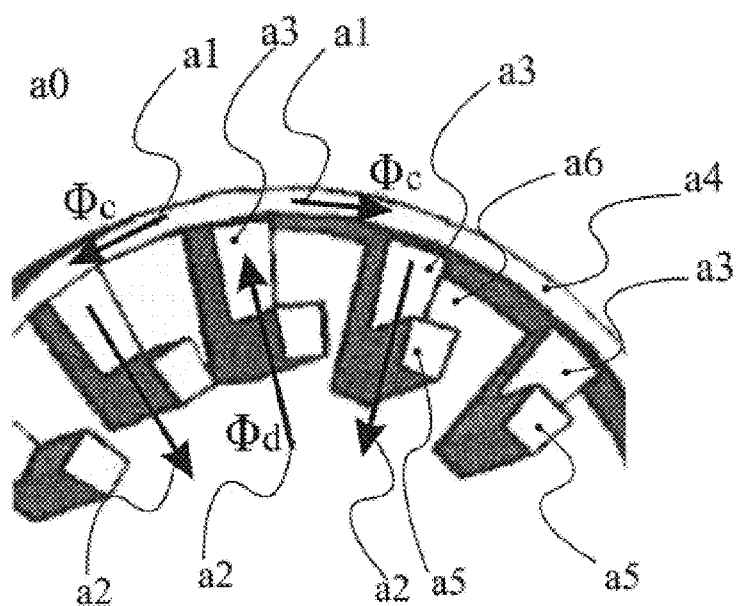
FIG. 5 illustrates the circulation of the magnetic fluxes in a normal machine phase.

The present invention exhibits a particular embodiment of the magnetic circuit of this homopolar rotating machine structure. FIG. 5 shows the trajectory of the magnetic fluxes in a core (a0) corresponding to the state of the art. Said core (a0) either corresponds to a core (b1), or to a core (b2), the joining of which forms a phase (d4). The magnetic flux Fd (a2) emitted by the combination of the rotor and stator fluxes is brought back along the teeth (b4) or (b5), through a tooth foot (a5) and a tooth leg (a3), in order to be divided into two identical portions Fc (a1) at the external frame yoke (a4). In this embodiment of the state of the art, the inter-teeth space (a6) is empty.

Magnetic flux conservation rules ensure that one skilled in the art in approaching the design of the rotating machine, imposes that the magnetic flux circulates at most in the magnetic circuit and at least in air. The result of this is that the optimum section of a leg (a3) at its connection with the frame yoke (a4) is critical, since there is too much magnetic material at this location, while the copper section available for the coil (b3) decreases and therefore couples it.

The state of the art consists of having the magnetic flux Fd (a2) circulate radially along the teeth (a3), and then has it brought back by the frame yoke (a1). An option for increasing the section of the coil (b3) consists of adopting a tooth shape as described in FIG. 9, where a phase is seen from the inside and unrolled flat. Both cores (b1) and (b2) forming a phase (b4) are recognized in this FIG. 9. The first known shape (b12a) is rounded, it allows the teeth (b13a) to be brought together angularly without generating magnetic leaks. The second pointed known shape (b13b) allows the teeth to be further brought angularly together without increasing the magnetic leaks. In both of these latter embodiments (b13a) and (b13b), the flux brought back by a tooth is optimized with regards to the section of the tooth. The lateral width of the walls of the cores (b1) and (b2) may then be reduced, and the radial height left free for the coil (b3) is increased.

Both of these tooth shapes (b13a) and (b13b) allow the teeth to be brought closer to each other, and therefore deflect the magnetic flux Fd (a2) before it attains the leg (a3), which allows reduction in the thickness of the walls of the cores (b1) and (b2). But said tooth shapes (b13a) and (b13b) have the drawback of creating magnetic interactions at their tips, in (b14a) and (b14b), via the opposite portion (stator or rotor depending on the case). A significant torque loss then ensues in the machine. The most clever way for increasing the torque provided by the phase (d4) consists of adopting straight teeth (b4) which do not have any magnetic leaks in (b14), but which impose resorting to the invention below in order to obtain a sufficient coil section (b3).

Figure 6:
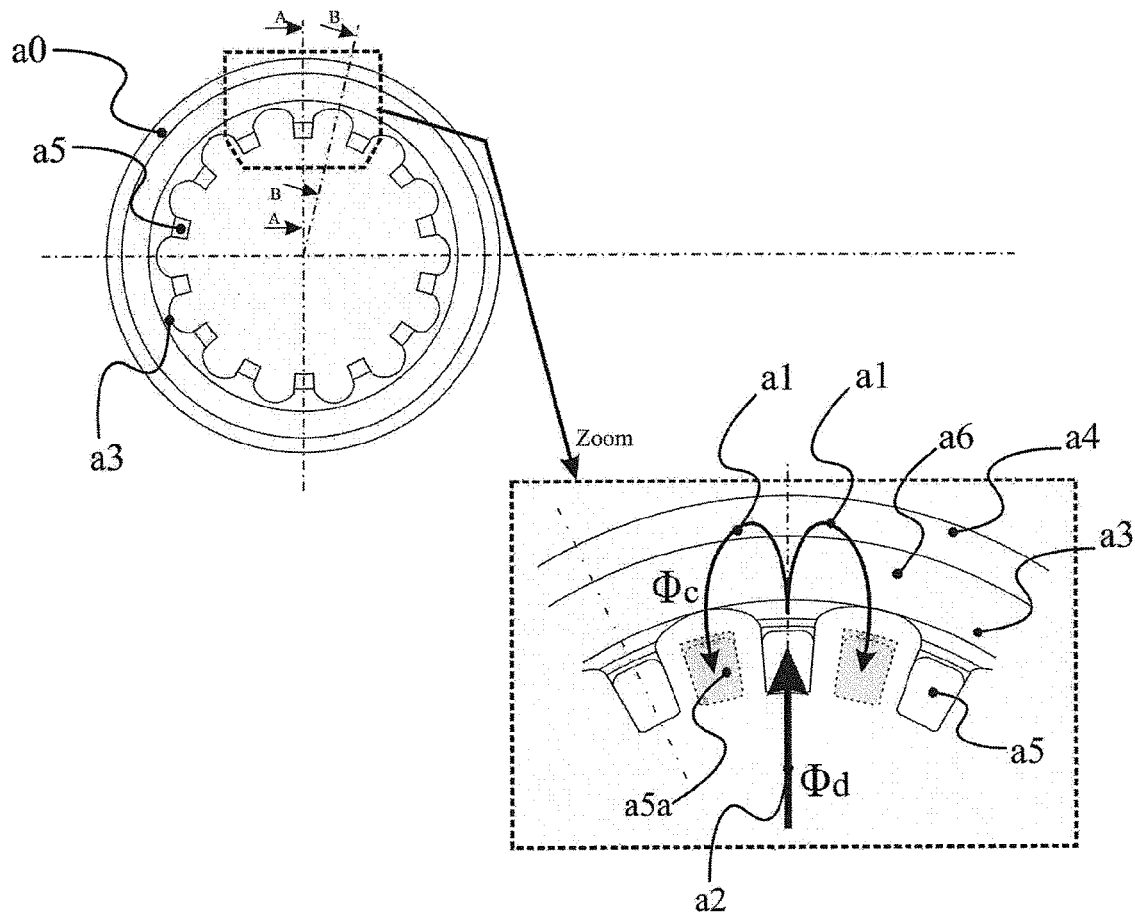
FIG. 6 illustrates the circulation of the magnetic fluxes in an optimized machine phase.
Figure 7:
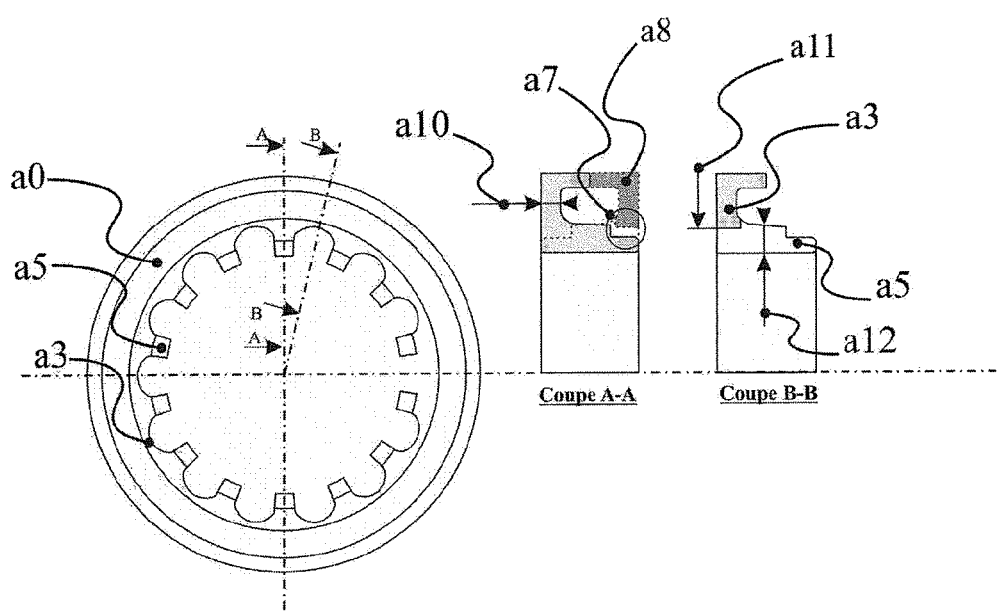
FIG. 7 illustrates a detail of the optimization of the shape of the core.

As this is visible in FIGS. 6 and 7, the teeth include a first portion, called a tooth leg (a3), extending radially relatively to the annular frame yoke (a4), and another portion called a tooth leg (a5), extending parallel to the axis of the annular phase and connected to an end of the tooth leg through a bend. The other end is free and is called a tooth tip or else tooth end.

Figure 9:
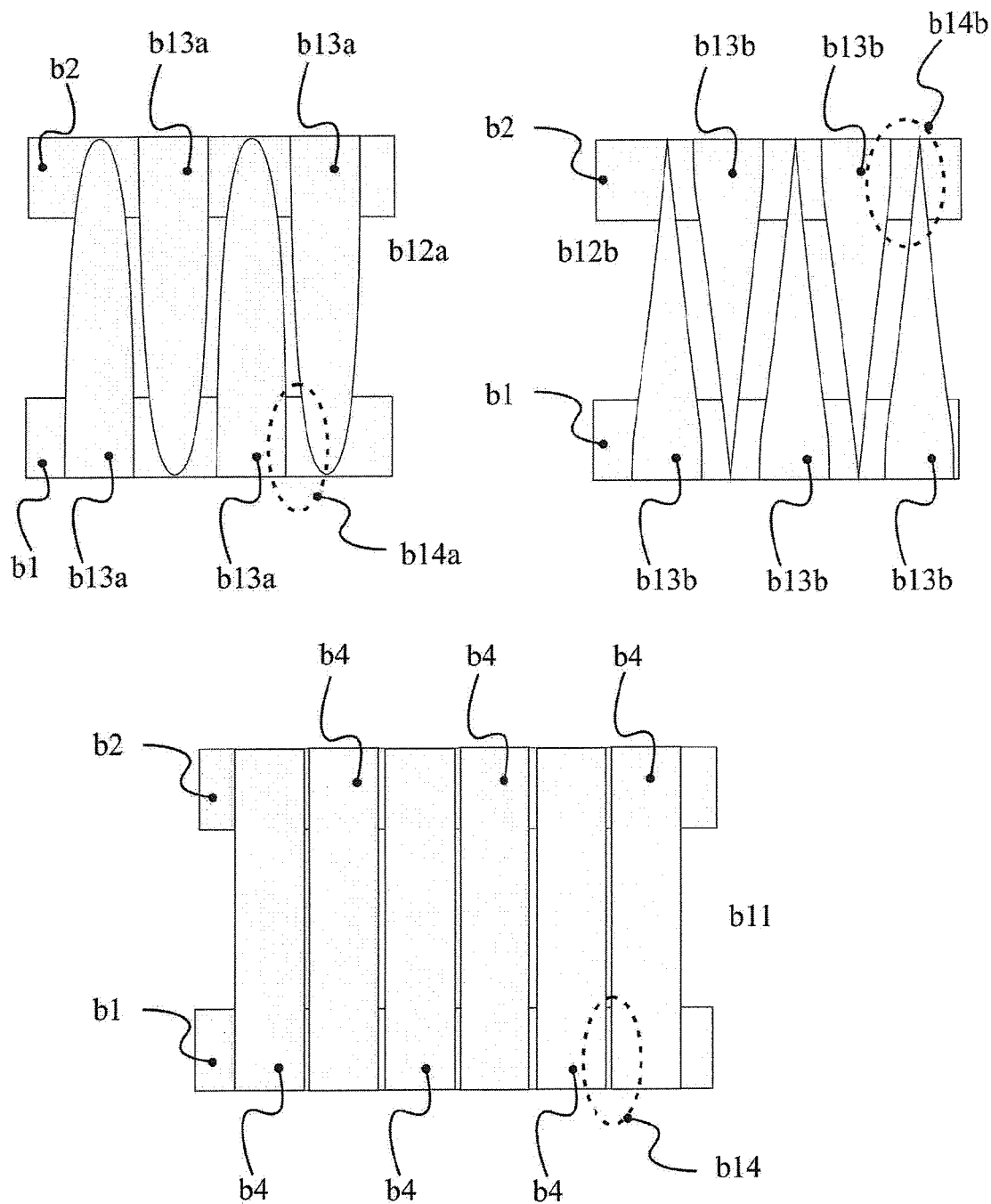
FIG. 9 compares the shapes of teeth between the state of the art and the invention.

As this is also visible in FIG. 9, the fact that the teeth are straight means that their tooth foot (a5) has two opposite sides which are respectively facing both adjacent teeth, both of these sides extending parallel to the axis of revolution of the frame yoke (d4) over the whole length of the tooth foot (a5).

In other embodiments, the teeth may be <<almost straight>> with both of these sides extending parallel to the axis of revolution of the frame yoke to within 10° preferably to within 5° and/or over at least 90% of the length of the tooth foot, preferably over at least 95%.

Figure 8:
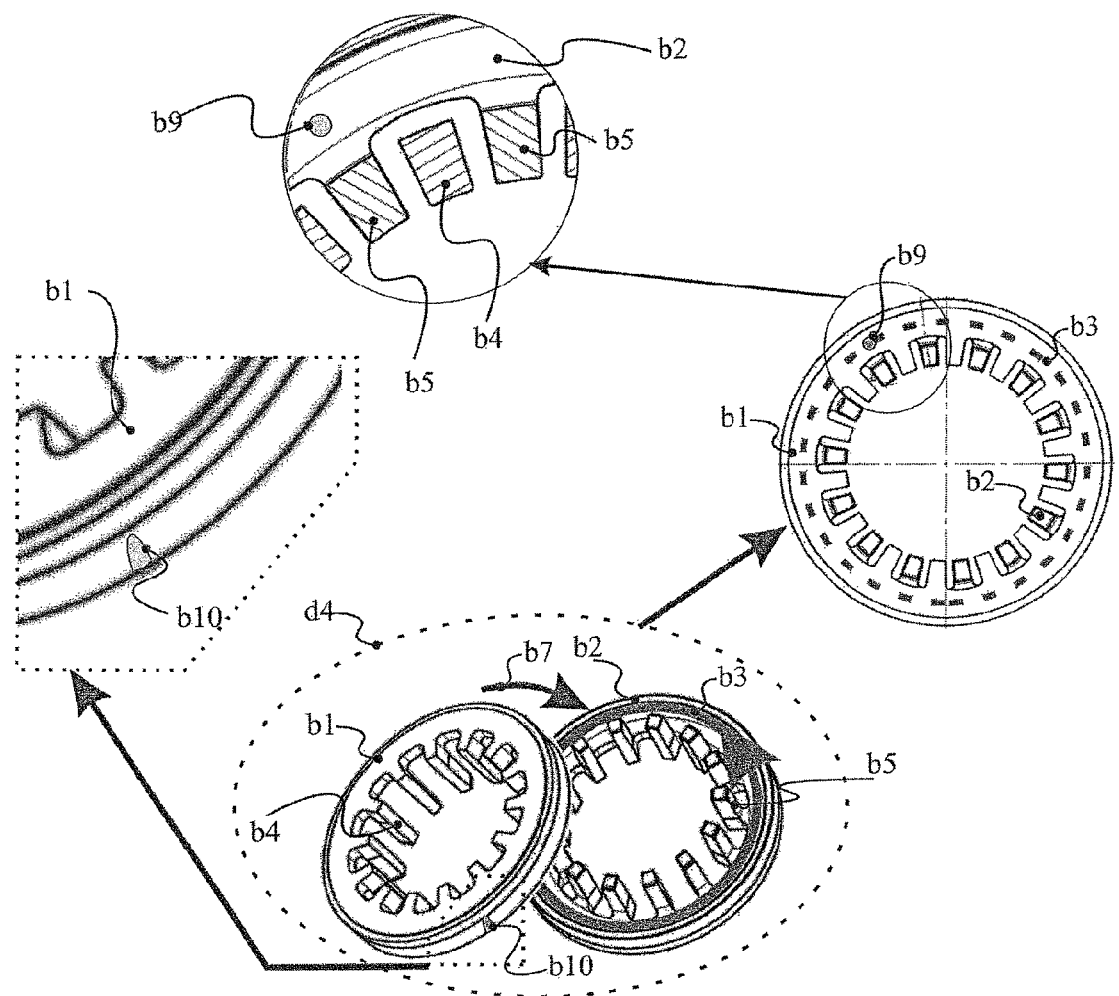
FIG. 8 illustrates the possibilities of drilling holes in the optimized wafer.

In the following description, the presentation of the invention is supported by figures:

FIG. 5 illustrates the circulation of the magnetic fluxes in a normal machine phase FIG. 6 illustrates the circulation of the magnetic fluxes in an optimized machine phase;

FIG. 7 illustrates a detail of the optimization of the shape of the core;

FIG. 8 illustrates the possibilities of drilling holes in the optimized wafer; and FIG. 9 compares the shapes of teeth between the state of the art and the invention.

The present invention exhibits in FIG. 6 a particular embodiment of the tooth formed with its foot (a5) and its leg (a3), said embodiment redirects the flux into the junction plane between two consecutive teeth (a3), in order to have it follow a path other than a radial path. The result of this is an increase in the corresponding copper section available for the coil (b3).

In the embodiment of FIG. 6, the flux Fd (a2) enters through the foot (a5) of each tooth, in the same way as described in FIG. 5. But as the space (a6) existing between two consecutive legs (a3) of the tooth is filled with the magnetic material instead of the void existing in FIG. 5, the magnetic flux Fd (a2) is divided into two fluxes Fc (a1), by passing into this latter inter-teeth space (a6), before reaching through a twisted path the opposite tooth (a5a), belonging to the opposite core of the phase (d4).

The result of this is a deconcentration of the magnetic flux at the foot of the tooth (a3), which allows it to be refined axially, and to therefore free up space in the axial direction for the coil (b3). The increase in the available volume for the conductor forming the coil (b3), ensures that the Joule losses of the machine are reduced, its efficiency is improved and its power is increased.

FIG. 7 shows how to optimize, in the design of the tooth formed with (a3) and (a5), the space (a7) located between the different portions of the teeth of the core (a0) and of the other core (a8) adhesively bonded on (a0). It is indispensable that this space (a7) be sufficient, in order to limit magnetic leaks between both cores (b1) and (b2), otherwise the magnetic interaction is reduced and also the torque of the machine.

Achieving this optimization consists of making in the area (a7) at the end of the foot (a5) of each tooth, a discontinuity allowing the internal radius (a11) of the leg (a3) to be reduced and therefore the coplanar section of said leg (a3) may be increased. With this clever trick, it is possible to reduce even more the axial thickness (a10) of the leg (a3) and the radial thickness (a12) of the foot (a5), which has the consequence of freeing up even more space for the coil (b3).

Preferably, the discontinuity is of at least 0.2 mm, still preferably at least 0.5 mm.

FIG. 8 shows how holes or notches (b9) or (b10) may be made in the cores (b1) and (b2). Said holes or notches (b9) or (b10) have the purpose of letting through the wires for powering the coil (b3), or of facilitating the passage of the overmolding resin, or reducing the amount of material of the cores (b1) and (b2). Said holes are placed in locations where the magnetic flux is reduced. In a first embodiment, said holes are located facing a tooth in the position (b9). In another embodiment, said holes are located on the outer diameter in (b10), as half-holes, complementary from one core (b1) to the other (b2), which considerably simplifies the passing of the wire of the coil (b3). Any other shape or localization of the holes is possible and may be contemplated.

All the elements which have been presented in this invention may be extended to other electric rotating or static machines including any number of electric phases and electromagnetic poles. The present invention is not limited to the described exemplary embodiments, but extends to any modification and obvious alternative for one skilled in the art, while remaining within the extent of the protection as defined in the appended claims.

It is particularly specified that the present invention may be directly applied to a machine structure of the (e4) type (a so-called direct, external phase (d4) type), or of the (e5) type (a so-called inverted, internal phase (d4) type. The passage of the description of this document, which discusses through its figures and explanations, essentially the machine structure (e4), has the structure (e5) being obtained by carrying out a radial symmetrical transformation of the parts forming the phases (d4) notably on the teeth (b4) and (b5), which then become exterior to the phase. One skilled in the art will be able to carry out this transposition without any difficulty.

The invention claimed is:

1. A homopolar motor, comprising:
    for each phase stator of the homopolar motor, a core including a plurality of teeth each including a leg and a foot, the leg of each tooth meeting a leg of an adjacent tooth at an internal ring portion formed by portions of the legs of the teeth, the internal ring portion being adjacent a cylinder head of the core to which the plurality of teeth are attached, said internal ring portion being disposed between the teeth,
    wherein the foot includes a step from an intermediate portion of the foot to a tip of the tooth at the foot.

2. The homopolar motor according to claim 1, further comprising holes or notches defined in a low magnetic induction area of the core, said holes or notches being configured to receive wires for each phase stator of the homopolar motor configured to supply electrical power to coils of each phase stator of the homopolar motor.

3. The homopolar motor according to claim 1, wherein the teeth are straight.

4. The homopolar motor according to claim 1, wherein each of the teeth has two sides respectively facing the two adjacent teeth and extending parallel to an axis of revolution of the cylinder head of the core to within 10°.

5. The homopolar motor according to claim 1, wherein a length of the step from the intermediate portion to the tip of the tooth at the foot is at least 0.2 mm.

6. The homopolar motor according to claim 1, wherein a length of the step from the intermediate portion to the tip of the tooth at the foot is at least 0.5 mm.

7. The homopolar motor according to claim 2, wherein the teeth are straight.

8. The homopolar motor according to claim 2, wherein each of the teeth has two sides respectively facing the two adjacent teeth and extending parallel to an axis of revolution of the cylinder head of the core to within 10°.

9. The homopolar motor according to claim 2, a length of the step from the intermediate portion to the tip of the tooth at the foot is at least 0.2 mm.

10. The homopolar motor according to claim 3, wherein a length of the step from the intermediate portion to the tip of the tooth at the foot is at least 0.2 mm.

11. The homopolar motor according to claim 4, wherein a length of the step from the intermediate portion to the tip of the tooth at the foot is at least 0.2 mm.

12. The homopolar motor according to claim 2, wherein a length of the step from the intermediate portion to the tip of the tooth at the foot is at least 0.5 mm.

13. The homopolar motor according to claim 3, wherein a length of the step from the intermediate portion to the tip of the tooth at the foot is at least 0.5 mm.

14. The homopolar motor according to claim 4, wherein a length of the step from the intermediate portion to the tip of the tooth at the foot is at least 0.5 mm.

15. The homopolar motor according to claim 4, wherein the two sides of each of the teeth respectively face the two adjacent teeth and extend parallel to the axis of revolution of the cylinder head of the core to within 5°.

16. The homopolar motor according to claim 1, wherein the two sides of each of the teeth respectively face the two adjacent teeth and extend parallel to the axis of revolution of the cylinder head of the core over at least 90% of the length of the tooth foot.

17. The homopolar motor according to claim 16, wherein the two sides of each of the teeth respectively face the two adjacent teeth and extend parallel to the axis of revolution of the cylinder head of the core over at least 95% of the length of the tooth foot.

18. The homopolar motor according to claim 8, wherein the two sides of each of the teeth respectively face the two adjacent teeth and extend parallel to the axis of revolution of the cylinder head of the core to within 5°.

19. The homopolar motor according to claim 1, wherein the two sides of each of the teeth respectively face the two adjacent teeth and extend parallel to the axis of revolution of the cylinder head of the core over at least 90% of the length of the tooth foot.

20. The homopolar motor according to claim 19, wherein the two sides of each of the teeth respectively face the two adjacent teeth and extend parallel to the axis of revolution of the cylinder head of the core over at least 95% of the length of the tooth foot.

* * * * *